TELEPHONE ANSWERING SYSTEM

Filed April 29, 1964 9 Sheets-Sheet 1

INVENTOR
R. R. LEONARD
BY William F. Simpson
ATTORNEY

Sept. 12, 1967 R. R. LEONARD 3,341,664

TELEPHONE ANSWERING SYSTEM

Filed April 29, 1964

9 Sheets-Sheet 3

Sept. 12, 1967 R. R. LEONARD 3,341,664

TELEPHONE ANSWERING SYSTEM

Filed April 29, 1964 9 Sheets-Sheet 8

United States Patent Office 3,341,664
Patented Sept. 12, 1967

3,341,664
TELEPHONE ANSWERING SYSTEM

Ralph R. Leonard, Murray Hill, N.J., assignor to Bell Telephone Laboratories, Incorporated, New York, N.Y., a corporation of New York
Filed Apr. 29, 1964, Ser. No. 363,360
16 Claims. (Cl. 179—51)

ABSTRACT OF THE DISCLOSURE

A multiple attendant position telephone switching system is arranged with switching circuitry responsive to the connection of an attendant's headset at one of the positions and the operation of a single key at that position to permit the attendant to handle calls that would otherwise be directed only toward busy or unoccupied attendant positions.

This invention relates to a telephone answering system and more particularly to automatic switching equipment for readily and rapidly changing the interconnections between answering positions or consoles in an answering bureau.

In previous telephone switchboards, it has been possible to interconnect the various operators' positions for different traffic conditions by operating one or more switches in each of the positions or sections of the switchboard. Also it has been necessary to change these switches each time it is desired to change the connections between the operators' positions as may be required by different traffic conditions. These difficulties become aggravated in an answering bureau where the traffic conditions change rapidly from hour to hour.

It is an object of my invention to provide automatic switching means jointly controlled by the connection of the operator's or attendant's headset to the switchboard or consoles and by the operation of a single manual switch to control the interconnections between the different positions and operators or attendants so that they may more effectively answer the various calls incoming to the answering bureau.

In accordance with the exemplary embodiment of my invention each position or console in the answering bureau is provided with two operators' or attendants' positions; a first operator or attendant's position and a second or helping attendant's position. All of the calls incoming to this console to be answered are automatically directed to the first attendant or operator if she is idle. If this operator is busy answering another call when a call comes to the particular position, it will be automatically directed to the second operator at that position, if she has her headset connected thereto and is idle.

In accordance with a feature of my invention provision is made so that two of the first operators at adjacent positions or consoles may have their circuits interconnected for teamwork provided the second attendant does not have her headset connected to either of these positions or consoles. By merely operating a single manual key, the two first operators will have their control circuits interconnected so that each may answer any of the calls incoming to their particular position or consoles so long as they are not engaged in answering another call. However, if either is busy and the other idle a call incoming to either position or console will be automatically directed to the other of the two first operators.

A feature of my invention relates to interlocking control circuits which prevent the connection of a second attendant's telephone set to the circuits of any position or console which is interconnected with an adjacent position in the manner described above which manner is called "teaming" herein. Thus the inadvertent attempt to connect a second headset to any console that is "teamed" with an adjacent console is ineffective and unable to interrupt, affect, or interfere with any call being answered by the operator at either console.

Another feature of my invention relates to control circuits which permit an operator or attendant to answer incoming calls at other positions or consoles by operating a single manual key. In the exemplary embodiment described hereinabove, all the positions adjacent to the first operator and between her position and the next position to which another first operator has her headset connected to the position or console circuits are grouped or interconnected with this operator by operating the manual key or switch.

In the exemplary embodiment of my invention described herein, these interconnecting circuits are arranged to interconnect the position or attendant circuits in the above-described manner on both sides of the first operator or attendant having her headset connected to any one of the given operator's positions or consoles.

Another feature of my invention relates to control circuits which prevent the inadvertent connection of an attendant's headset with the position circuits when the position circuit is grouped with any other position or console. Thus such improper actions do not interrupt, affect or interfere with any call being answered.

Still another feature of my invention is directed to control circuits for interrupting the grouping circuits between any two consoles or positions which are interconnected for teaming operations.

Another feature of my invention is to arrange the position circuits in sections or groups which may be operated independently of each other during normal traffic answering conditions but in response to the interconnection of only a single first attendant's headset to any one of the corresponding attendant's positions cause all of the positions or console control circuits to be interconnected so that the one attendant may respond to and answer a call incoming at any one of the attendants' positions.

In accordance with an exemplary embodiment of my invention the control circuits are arranged so that the inadvertent disconnection of an attendant's headset while she is answering a call does not disconnect the call being answered.

Another feature of my invention is directed to control circuits which prevent the interruption of the grouping or teaming of the operator's positions while calls are being answered and thus prevent the interruption of such calls.

Novel features of the incoming line circuits at the answering bureau and of the control circuits which respond to ringing current shown and described but not claimed herein are claimed in the copending application of V. R. De Stefano, Ser. No. 363,359, filled on the same date herewith.

The above and other objects and features of my invention may be more readily understood from the following description when read with reference to the attached drawing, in which.

Figure 5:
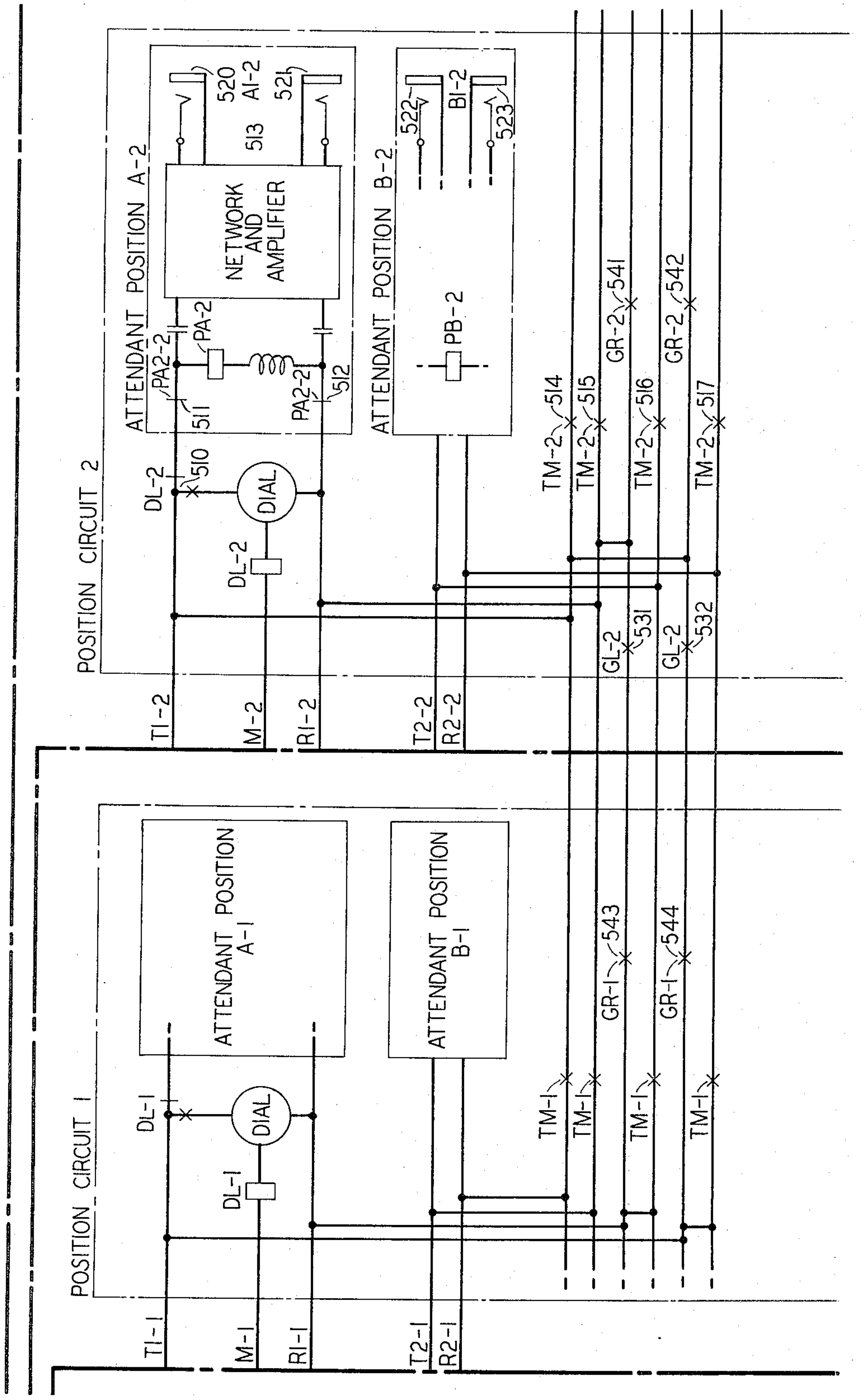
Figure 6:
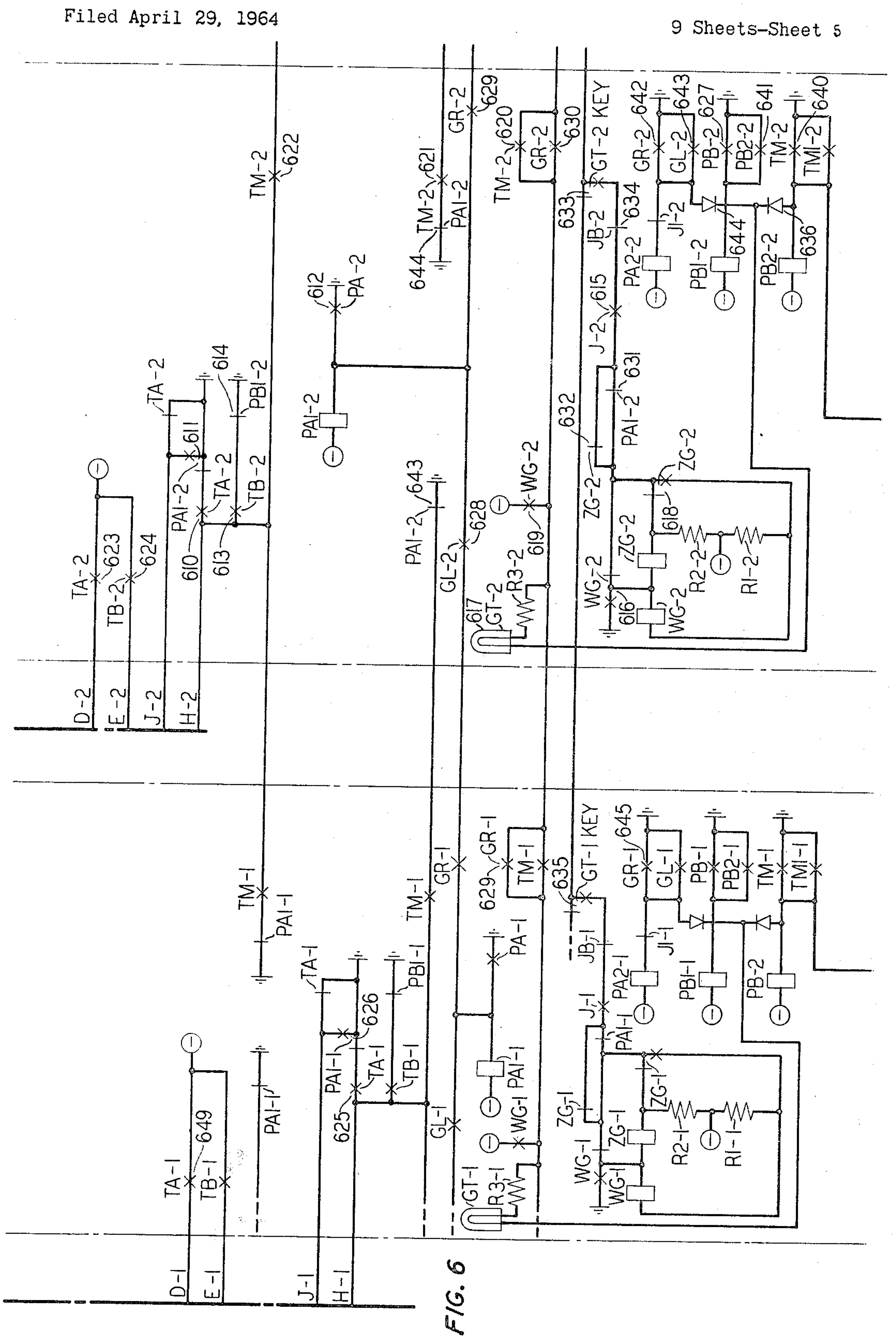
Figure 7:
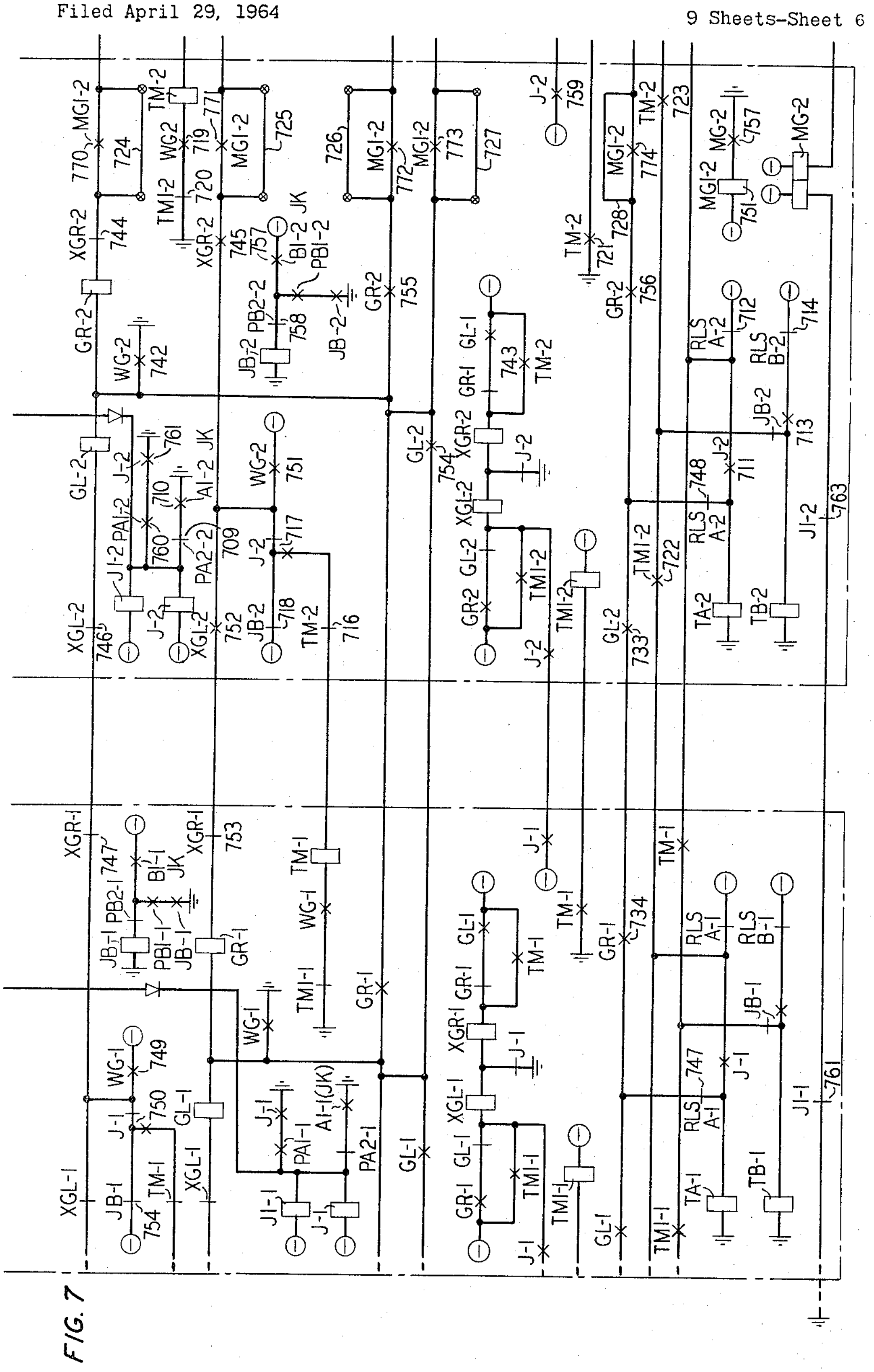
Figure 8:
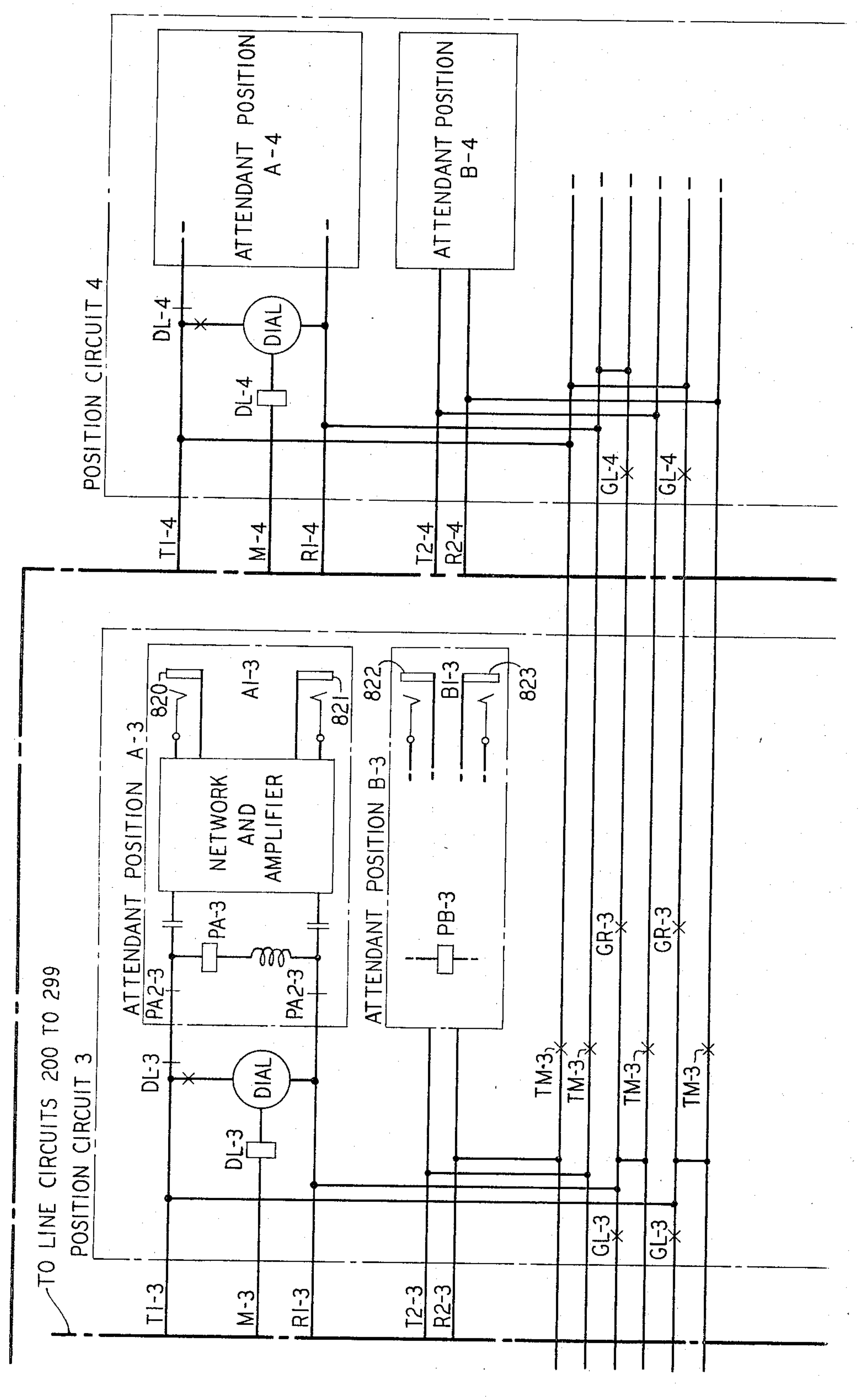
Figure 9:
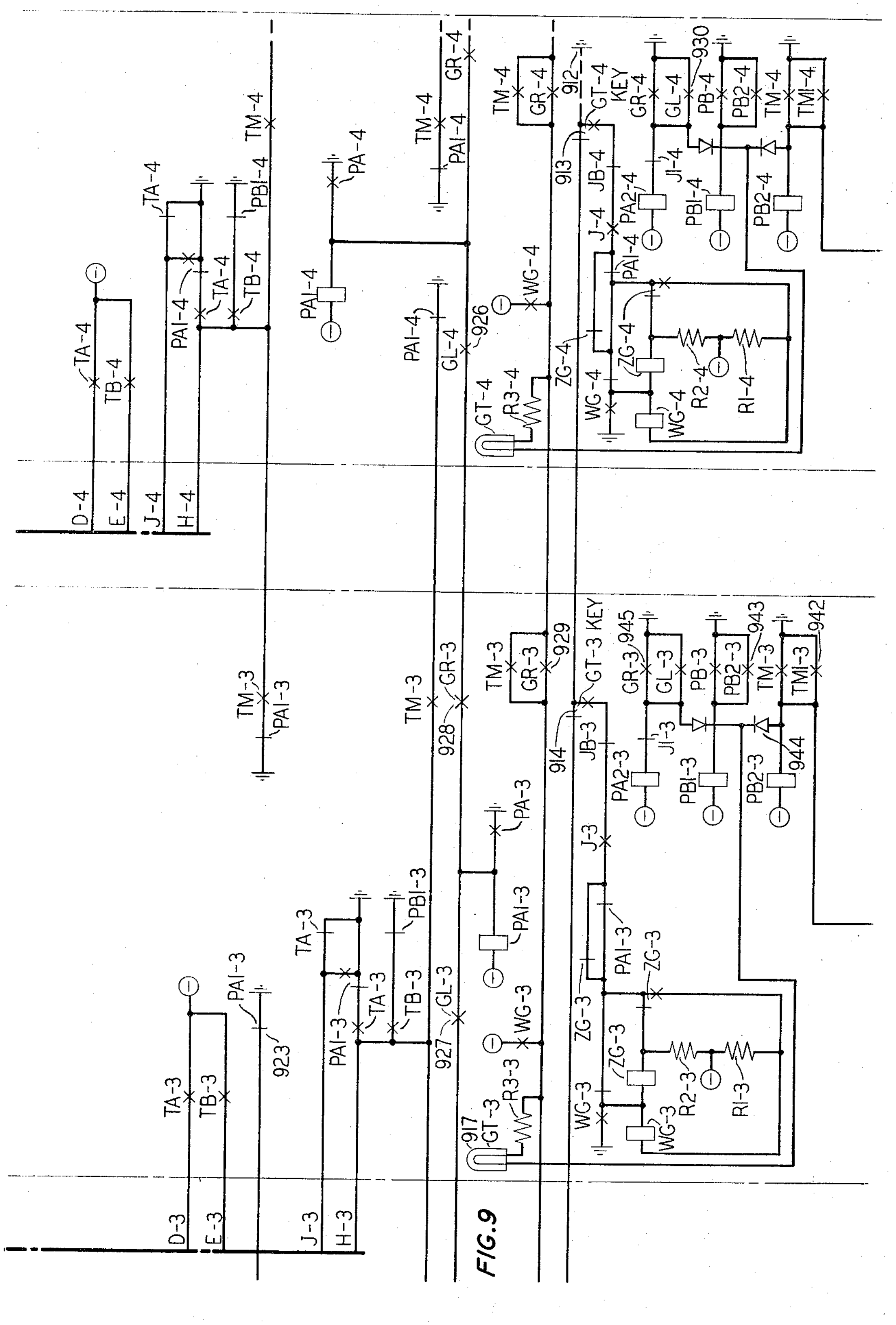
Figure 10:
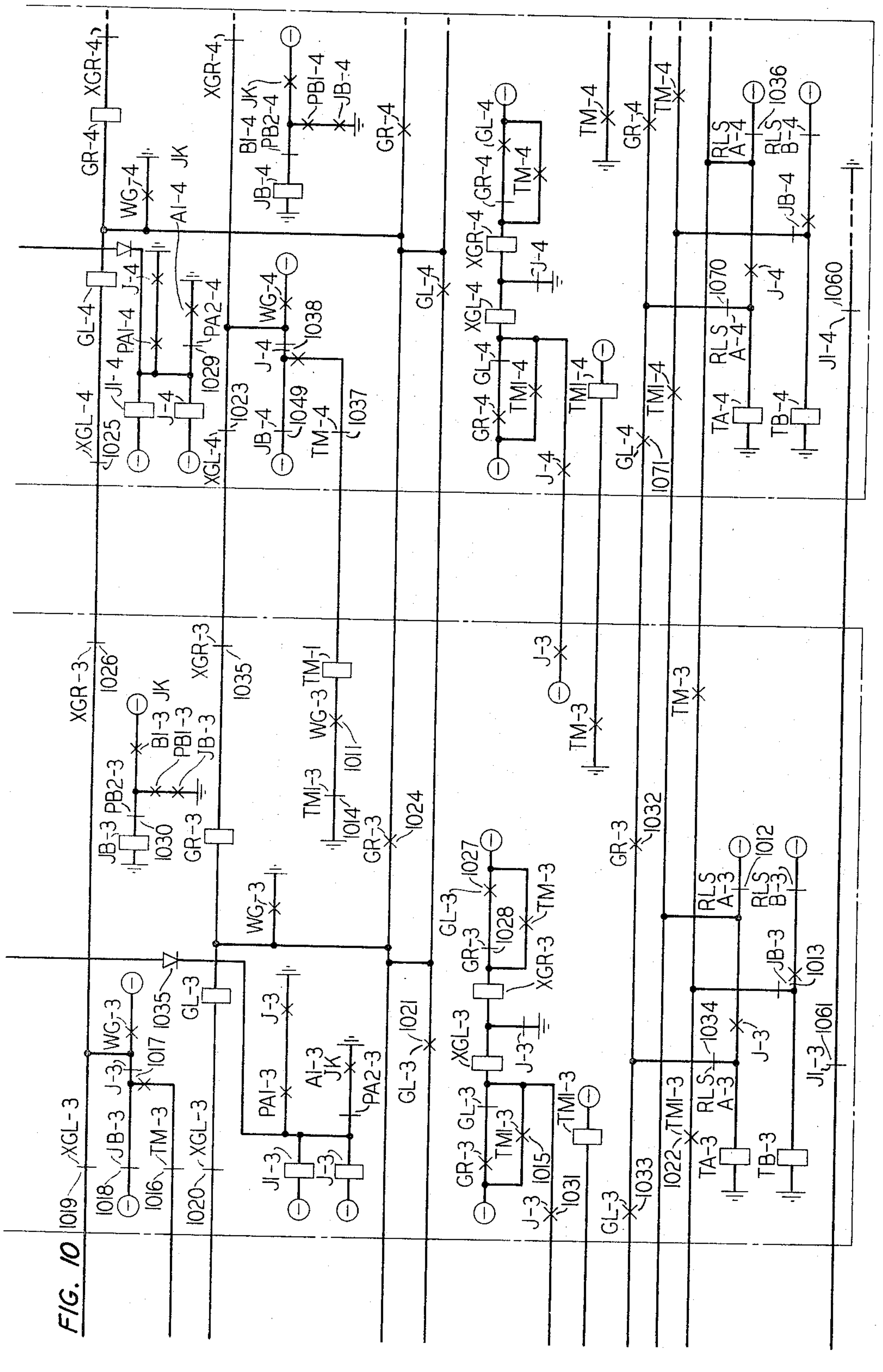

FIGS. 5 through 10, inclusive, show four position circuits or four consoles in the answering bureau together with the control circuits therefor and the manner in which these control circuits are and may be interconnected;

FIGS. 5 and 8 show the operator or attendant's circuits at four of the adjacent positions or consoles; and FIGS. 6 and 9, 7 and 10 show the control circuits and interconnected circuits for these four adjacent positions or consoles.

Figures 1, 2:
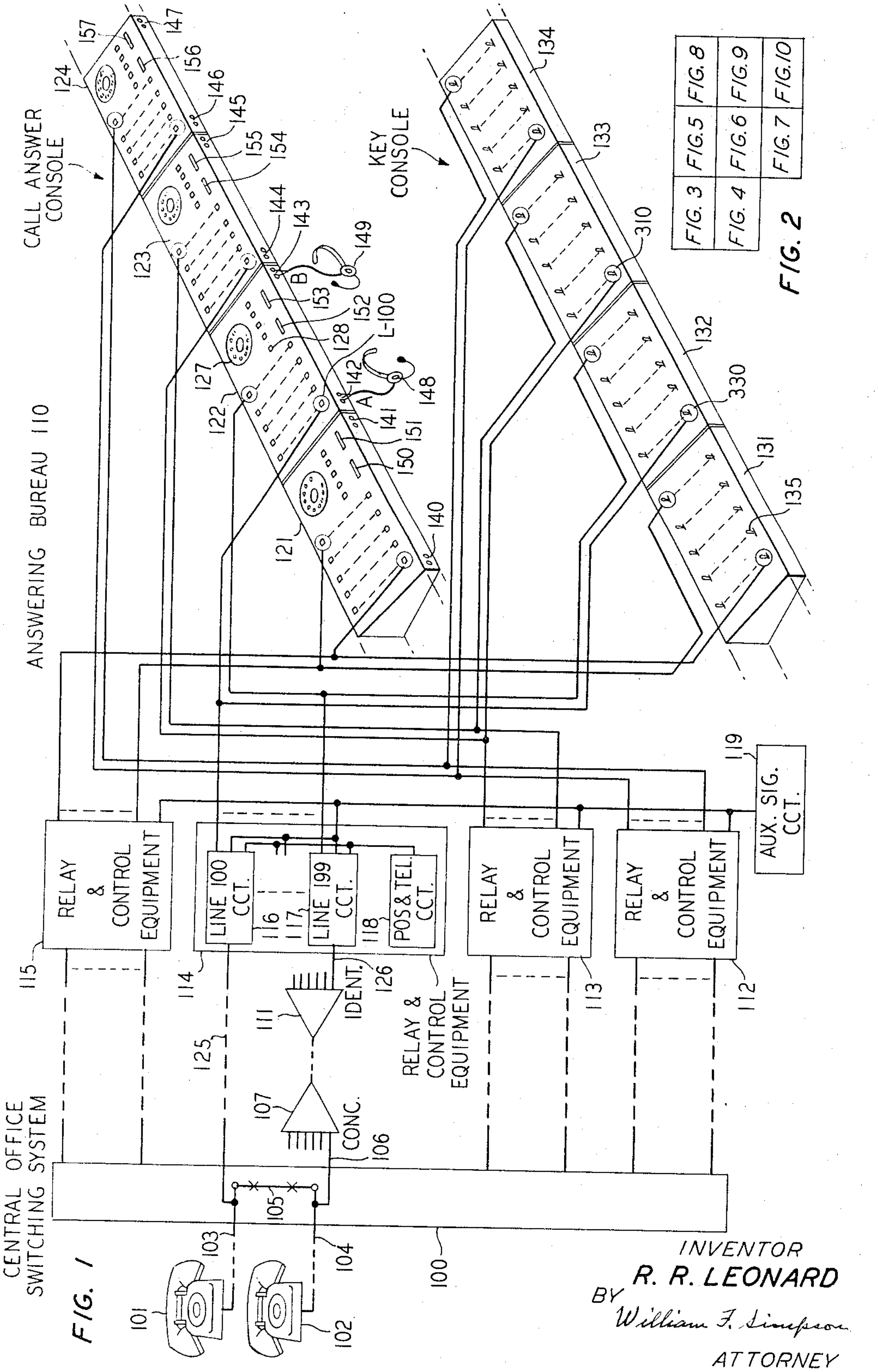
FIG. 1 shows the various components of the overall answering system and the manner in which they are interconnected and cooperate with each other.
FIG. 2 shows the manner in which FIGS. 3 through 10, inclusive, are arranged adjacent each other.

FIG. 1 shows the various component parts of an exemplary answering system in accordance with my invention.

The answering bureau 110 comprises four consoles 121, 122, 123 and 124. The answering bureau 110 also includes a corresponding number of key consoles 131, 132, 133 and 134. The number of these consoles may be extended in either direction from the four shown in FIG. 1. Each of these consoles in the exemplary embodiment of my invention is arranged to provide for or permit the answering of a hundred different lines and each of the lines to be answered is provided with a combined line lamp and line key designated L–100 for line 125. Each of the answering consoles also has a corresponding key console in which a key is provided for each of the lines to be answered.

The key provided for each line is arranged to be operated in any one of three positions and to remain in any one of these positions until moved to another one of these positions. In one position of this key the equipment at the answering bureau does not respond to calls directed to the subscriber's lines served by the answering bureau. In another position the circuits are arranged so that the equipment at the answering bureau respond to the first ringing signal applied to the subscriber's lines. In the third position of the key the circuits at the answering bureau do not signal the attendant to answer the call until the third ringing signal has been applied to the subscriber's line.

The relay and control equipment 115 is provided for the first console 121 and the associated key console 131. The relay and control equipment 114 is provided for the second answering console 122 and the related key console 132. The relay and control equipment 113 is provided for the third answering console 123 and the key console 123. The relay and control equipment 112 is provided for the fourth call answer console 124 and the key console 134.

Each of the call answer consoles is provided with an A attendant's jack such as 140, 142, 144 and 146. Likewise, each of these consoles or positions is provided with a B attendant's jack 141, 143, 145 and 147.

As shown in FIG. 1 an attendant's headset 148 is connected with the A jack of the second console and an operator's headset 149 is shown connected with the B jack of the same console or position 122.

Each of the positions or consoles is provided with an A release key or bar 150, 152, 154 and 156 and with a B release key or bar 151, 153, 155 and 157. Each of the consoles is provided with a grouping and teaming key such as 128 and with a dial 127. When desired each of these console positions may also be provided with a card dialer or other automatic dialing arrangement to permit the attendant to make outgoing calls from the answering bureau.

The relay equipment 114 is shown in greater detail in FIG. 1 than is the relay equipment 112, 113 and 115. These relay equipments also include the equipment such as shown in 114. This equipment includes a line circuit such as 116 and 117 for each of the individual lines to be answered by the answering bureau. This relay equipment also includes the position and operator's telephone circuits 118 and an auxiliary signaling circuit 119.

The answering bureau is interconnected with the central office switching system by a plurality of trunk or line circuits. These lines or trunk circuits may comprise a pair of wires for each subscriber line that is to be answered. The conductors 125 illustrate such a line or trunk circuit extending between the answering bureau and the central office. This pair of wires is interconnected with the subscriber's line 103 extending to the subscriber's station 101. This interconnection is usually at the central office 100 but need not be. The interconnection may be at any point along the subscriber's line.

Alternately, a subscriber's line such as 104 extending to the subscriber's station 102 may be connected by means of line 106 to concentrator 107 and this concentrator in turn interconnected by a small number of lines or trunks to identifier 111 near or at the answering bureau and the output from the identifier then connected to line circuit such as 117 at the answering bureau. Any of the connections for any of the lines to be answered, may be provided by the individual trunk circuits such as 125 or they may be interconnected through a concentrator identifier such as illustrated by the conductors 106 and 126.

The central office is represented by the rectangle 100 in FIG. 1 and two representative subscribers' stations 101 and 102, which are to be provided with answering service, are interconnected with the central office by means of the subscribers' lines 103 and 104, respectively. These lines may be interconnected by means of the switching equipment represented by 105 in FIG. 1. This switching equipment may be of any suitable type including manual switching systems as well as automatic switching systems of any desired type.

In the specific embodiment of the invention described herein, it is assumed that this switching equipment is arranged to provide calling signals on the subscriber's line normally called ringing current and that this applied in cycles of two seconds of ringing current each one ring followed by four seconds of silent interval and then the above cycle repeated until the subscriber answers or the call is abandoned.

Details of typical circuits of an exemplary answering bureau embodying my invention are shown in FIGS. 3 through 10 when arranged as shown in FIG. 2.

Assume now that an attendant has inserted her telephone in the attendant's jacks 520 and 521 in the A position of the console designated position circuit 2 in FIG. 5. As a result, with the PA2–2 relay released and contacts 709 closed the J–1 and J–2 relays shown in FIG. 7 operate due to the closure of the jack contacts 710 which are operated when the operator or attendant inserts her headset in the position jacks 520 and 521. As a result, the contacts of the J–2 relay 711 close and complete a circuit for the operation of the TA–2 relay of FIG. 7. This circuit extends from ground through the winding of the TA–2 relay, the operated contacts 711 of the J–2 relay and then through the RLS contacts 712 of the A release key to negative battery. The position or attendant's circuit now is conditioned to respond to answering incoming calls.

Also assume that the subscriber at station 101 receives a call which this subscriber does not answer. Also, assume that in response to instructions given by him to the answering bureau, the switch 330 is set in the 3 rings postiion so that the circuits at the answering bureau delay the signaling of the attendant until the beginning of the third ring or ringing signal applied to the subscriber's line 103. As described above, the line conductors 125 are interconnected with the subscriber's line conductors 103 and extend to the answering bureau in accordance with the exemplary embodiment of this invention described herein.

These conductors 125 may be extended directly to the subscriber's line conductors 103 or they may be connected through concentrating equipment both at the central office and at the answering bureau as described above. It is assumed that the conductors 125 extend directly to the line conductors 103 but as described above the system works equally well if concentrating equipment is interposed between the subscriber's line 103 and the line 125.

Thus when ringing current is applied to the subscriber's line 103 extending to the subscriber's station 101 ringing current is also transmitted over the line conductors 125 extending to the answering bureau.

It is assumed that this ringing current is applied to the ring conductor extending to the answering bureau. If the ringing current is applied to the tip conductor of the subscriber's line then the connections of the conductor 125 to the subscriber's line will be reversed so that the ring conductor at the answering bureau will be interconnected to the tip of the subscriber's line at the central office. As a result ringing current will be transmitted through the break contact 309 of the H relay and then through the resistor R13 and capacitor C1 to the neon lamp or tube N1. The voltage applied to this neon lamp by the ringing current is of sufficient magnitude to ionize the gas within the tube with the result that current flows through this tube and then through the rectifying circutis comprising the diodes CR4 and CR5. As a result the condenser C3 will be charged by this rectified current. The voltage on the condenser C3 is then transmitted through the resistor R11 to the base of the transistor Q4. The impedance of the above circuit from contacts 309 of relay H is sufficiently high so that the ringing current applied to the subscriber's line at the central office 100 is not tripped, interrupted or otherwise affected.

Q4 is normally turned off but the application of the voltage from the rectifying diode CR4 causes this transistor to be turned on and in turn operates relay L due to current flowing through its upper winding from battery to the collector of the transistor Q4.

In the exemplary embodiment of this invention described herein, it is assumed that ringing current is applied to the subscriber's line for a period of approximately two seconds followed by a silent interval of approximately four seconds after which the above cycle is then repeated. Of course any other suitable ringing cycles may be employed. The L relay of FIG. 4 is thus operated in the manner described above during each two seconds ringing signal and releases during the following four seconds silent interval.

Figure 3:
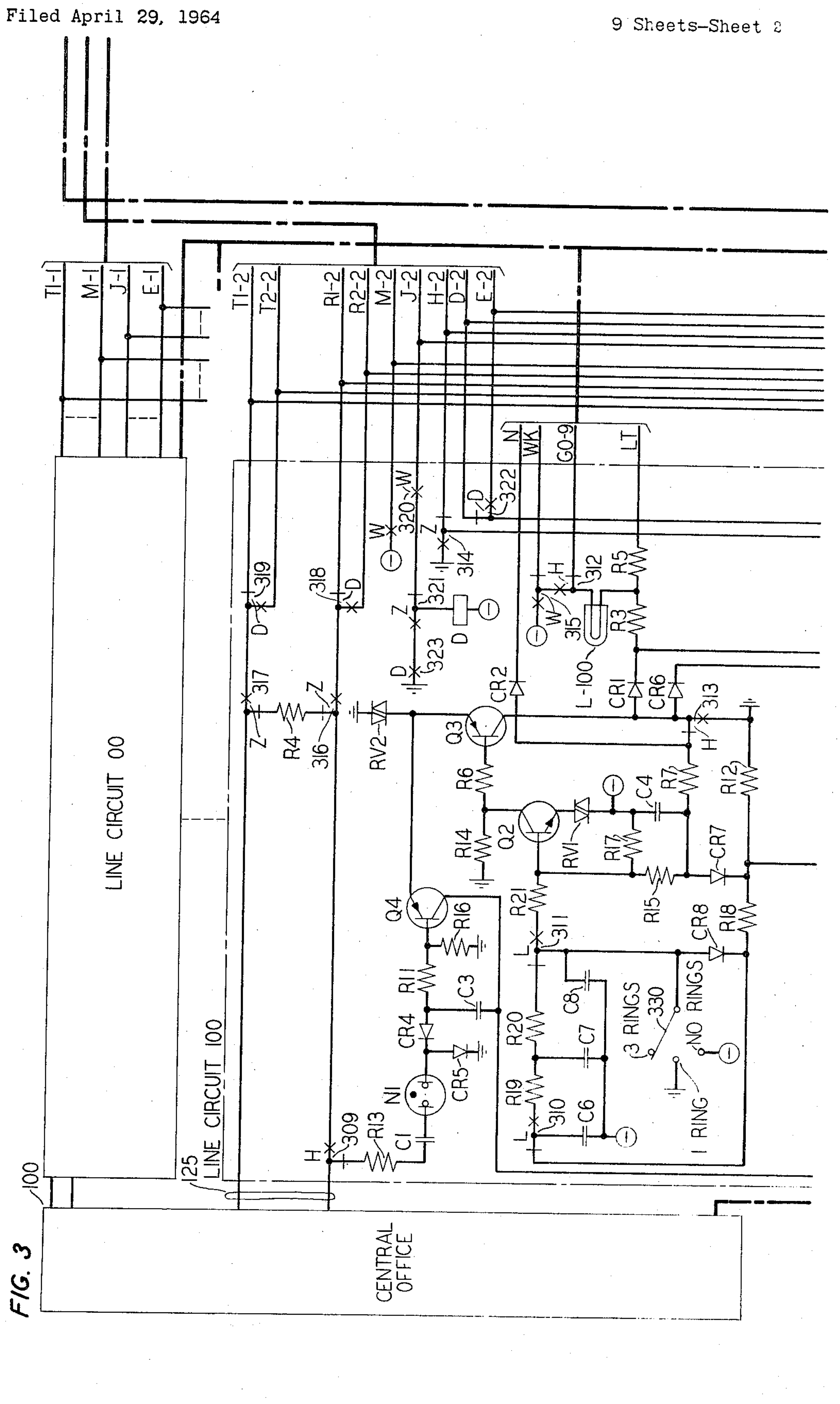
FIGS. 3 and 4 show the details of an exemplary one of the incoming line circuits in the answering bureau.
Figure 4:
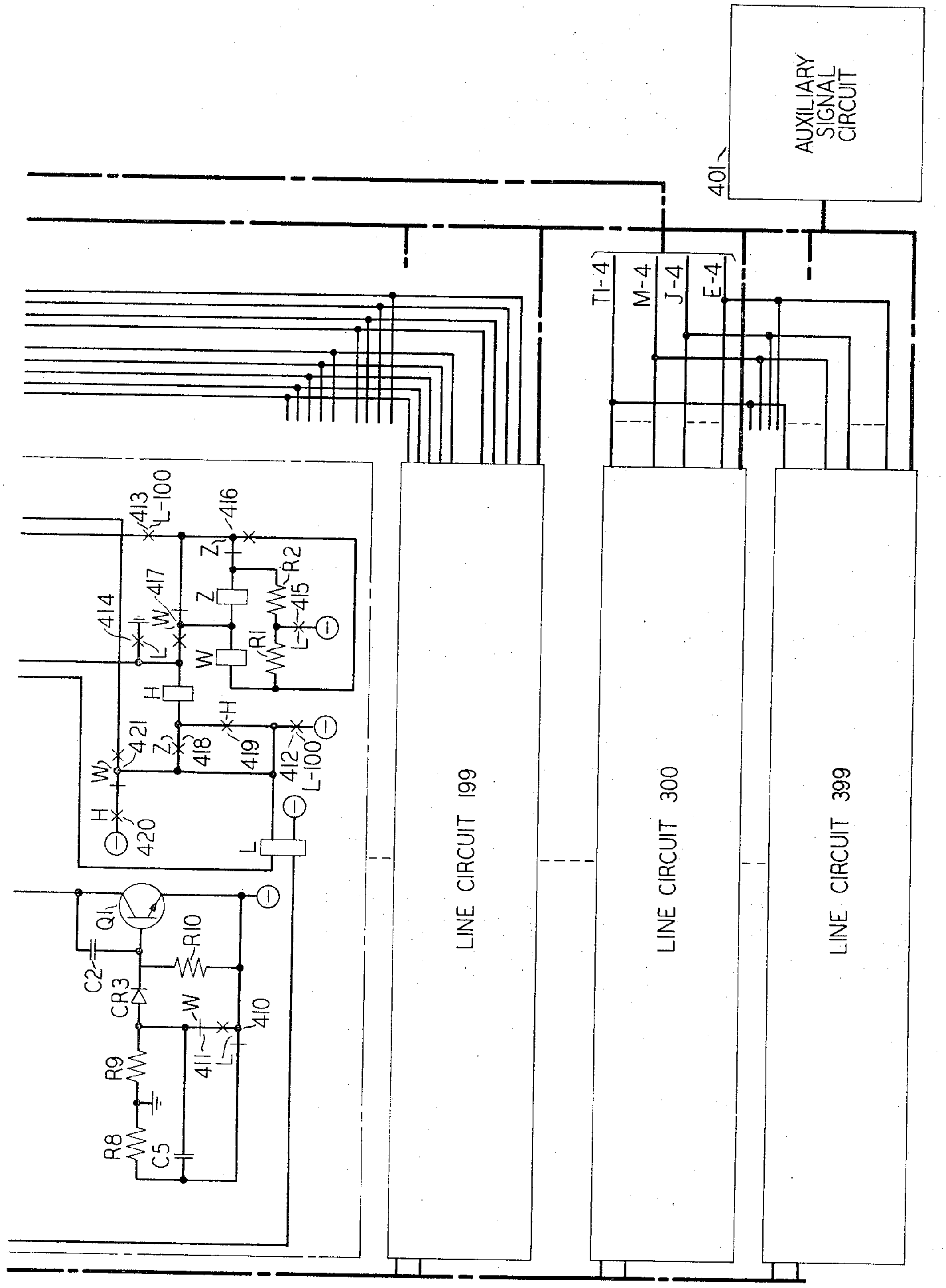

Transistor Q1 of FIG. 4 is normally biased so that it is conducting or turned on due to a voltage drop across resistor R10. The voltage drop across this resistor is due to current flowing from negative battery through resistor R10, diode CR3 and resistor R9 to ground. The voltage drop across resistor R10 is applied across the emitter junction of the transistor Q1 and causes this transistor to be turned on with the result that the collector of this transistor is at substantially the battery voltage which voltage also appears across the resistor R12. Under these circumstances transistors Q2 and Q3 of FIG. 3 are turned off or biased so that they are not conducting. The bias circuit for transistor Q2 extends through the diode CR7 and resistor R15 to the base of transistor Q2 which is thus held more negative than the emitter. The varistor RV1 connected between the emitter and negative battery provides sufficient voltage drop to insure that the transistor Q2 is turned off. With this transistor turned off, no current flows through resistor R14 so that the transistor Q3 is likewise turned off due to the voltage across the varistor RV2. In addition with the L relay released the condenser C5 has negative battery voltage applied to its left-hand terminal and ground through resistor R9 to its right-hand terminal. Thus, this condenser is charged to substantially full battery voltage.

In addition, negative voltage from the transistor collector Q1 is transmitted to the upper terminals of the condensers C6, C7 and C8 of FIG. 3 so that these condensers are substantially discharged because their lower terminals are also connected to negative battery.

When the L relay operates in the manner described above in response to the first ringing or call signal applied to the called subscriber's line, the contacts 410 are actuated. As a result, negative battery is removed from the left-hand terminal of condenser C5 and applied to the right-hand terminal thereof through the break contacts 411 of relay W. As a result the charge on the condenser C5 is reversed through the resistor R8 and the right-hand terminal of this condenser becomes charged negatively with respect to the left-hand terminal.

The operation of contacts 410 in addition applies negative voltage through the contacts 411 and the diode CR3 to the base of the transistor Q1. As a result this transistor is turned off and removes positive battery from the lower terminal of the diode CR7 and the junction of resistors R18 and R12.

At the end of the first ringing interval or call signal applied to the subscriber's line, the ringing current is interrupted and the L relay thereupon releases.

The release of the L relay causes the contacts 410 to be restored whereupon negative battery voltage or potential is applied to the left-hand terminal of condenser C5. Since the right-hand terminal is charged now to substantially battery voltage and negative voltage is now connected to the left-hand terminal, the right-hand terminal now becomes negative to a value of substantially twice the battery voltage. This potential is applied through the diode CR3 to the base of transistor Q1 which tends to maintain the transistor Q1 turned off. This voltage also tends to discharge through the resistor R9. The time constant of this discharging circuit however is such that it requires a time interval appreciably longer than the interval between ringing signals to discharge condenser C5 to the voltage at which the transistor Q1 will be turned on.

The release of the L relay at this time also restores the contacts 310 to their initial condition whereupon the upper terminal of condenser C6 is connected through the resistors R18 and R12 to ground. Consequently, condenser C6 now becomes charged with the upper terminal at substantially ground potential and the lower terminal at negative battery voltage.

In response to the succeeding ringing signal or current the L relay will be reoperated in the manner described above and cause contacts 410 and 310 to be operated. The operation of the contacts 410 causes condenser C5 to be recharged to the battery voltage with negative potential applied to its right-hand terminal and ground to its left-hand terminal through resistor R8. In addition the negative voltage through the contacts 410 is applied to the diode CR3 which in turn maintains the transistor Q1 turned off.

The operation of contacts 310 of the L relay at this time connects the upper terminal of condenser C6 through resistor R19 to the upper terminal of condenser C7. Consequently, condenser C7 receives a charge so that its upper terminal is no longer at the negative battery voltage. In other words, a portion of the charge on condenser C6 is transferred to the condenser C7 at the beginning of this second ringing interval.

At the end of the second ringing interval the L relay will release again and cause the contacts 410, 310 and 311 to again be restored to their unoperated or initial conditions. As a result the transistor Q1 is maintained in its off state and condenser C5 again starts to discharge through the resistor R9. In addition the contacts 310 again connect the upper terminal of condenser C6 to ground through the resistors R18 and R12 thus again restoring the full charge on this condenser.

Release of the contacts 311 of the L relay which produced no effect prior to this time now interconnect the upper terminal condenser C7 through resistor R20 to the upper terminal of condenser C8, thus causing the transfer of a charge from the upper terminal of condenser C7 to the condenser C8. As a result the voltage or potential of the upper terminal of condenser C8 changes from negative battery voltage to a voltage closer to ground potential.

At the beginning of the third ringing interval the L relay will again reoperate and close the contacts 410, 310 and 311 in the manner described above. The operation of the contacts 410 again maintains the transistor Q1 in the turned off state and causes condenser C5 to be recharged in the manner described above. The operation of contacts 310 also cause a portion of the charge on condenser C6 to be transferred to condenser C7 in the manner described above.

The operation of contacts 311 at this time connects the upper terminal of condenser C8 through the resistor R21 to the base of the transistor Q2. As a result the transistor Q2 is now biased to an "ON" condition since current will now flow to the base and through the emitter junction of this transistor and through the varistor RV1 to negative battery. With transistor Q2 conducting current will flow from ground through the resistor R14 and the collector-emitter junction of transistor Q2 to negative battery through the varistor RV1. The voltage drop across resistor R14 is applied through resistor R6 to the base of the transistor Q3 which causes the emitter junction of the transistor Q3 to be forward biased thus turning "On" this transistor and causing current to flow from ground through the varistor RV2, the emitter and collector junctions of transistor Q3, the diode CR1 and resistor R3 and lamp L–100, the normal contacts 312 of the H relay over the GO–9 conductor to the auxiliary signal circuit and then to negative battery through an interrupter. Consequently, lamp L–100 flashes and indicates that a call is to be answered. A circuit is also completed from the collector of transistor Q3 through the normal contacts 313 of the H relay and diode CR2 over the N conductor to an auxiliary signal circuit which operates to actuate visual or audible signals to attract the attendant's attention.

The collector of the transistor Q3 is also connected through the break contacts 313 of the H relay and resistor R7 and resistor R15 to the base of the transistor Q2. With the transistor Q3 turned on the collector is relatively close to ground voltage and this voltage is fed back through the resistors R7 and R15 to the base of the transistor Q2 to maintain this transistor in an "On" or conducting condition independently of the continued operation of the L relay. Thus, if the attendant does not respond to the lamp signal L–100 before the end of the third ringing interval when the L relay releases the transistors Q2 and Q3 neverthless remain conducting and the lamp L–100 continues to flash in response to the interrupted voltage applied to the GO–9 lead and the audible signal remains on in the auxiliary signaling circuit.

The attendant in responding to the line lamp L–100 will momentarily operate the nonlocking line key L–100 which in turn causes contacts 412 and 413 to close, it being recalled that this is a combined line key and line lamp.

If the line relay L is operated at this time then the closure of contacts 412 produce no useful result. If, on the other hand, relay L is released when the attendant operates the line key, contacts 412 complete a circuit for the operation of the L relay from battery through the operated contacts 412, the lower winding of this relay and then through the CR6 diode to the collector of the transistor Q3, through this transistor and the varistor VR2 to ground. With contacts 415 of the L relay closed and contacts 413 of the line key L–100 closed a circuit is completed for the operation of the W relay. This circuit extends from battery through the operated contacts 415 on the L relay, the R1 resistor, the winding of the W relay, the normal contacts 417 of the W relay, the closed contacts 413 of the line key, the normal contacts 314 of the Z relay and then over the H2 conductor to the second position circuit and then to ground through the operated contacts 610 of the TA–2 relay and the break contacts 611 of the PA1–2 relay to ground. These contacts are in the position circuit and are operated in response to the attendant connecting her headset to the headset jacks 520 and 521 in the manner described above.

The Z relay does not operate at this time because ground is connected to both of its winding terminals. The ground from the position circuit over the H2 lead as described above extends through the contacts 314, the key contacts 413, the normal contacts 416 of the Z relay to the right-hand terminal of the winding of the Z relay. This same ground also extends through the key contacts 413 and the normal contacts 417 of the W relay to the left-hand terminal of the Z relay, thus preventing this relay from operating.

The operation of the W relay causes contacts 417 to operate which contacts complete a holding circuit for the W relay from ground through the L relay contacts 414 and the operated contacts 417 of the W relay to the right-hand winding of relay W and then through this winding and the resistor R1 to negative battery through the operated contacts 415 of the L relay.

Ground is also connected through the operated contacts 414 of the L relay and the operated contacts of the W relay 417 to the left-hand winding terminal of the Z relay, thus preventing this relay from operating.

The operation of the W relay also completes a circuit for holding the L relay operated from battery through the operated contacts 623 of the TA relay in the position circuit, over conductor D–2, the normal contacts 322 of the D relay and the operated contacts 421 of the W relay to the right-hand winding terminal of the lower winding of the L relay, thus maintaining this relay operated independently of the operation of the line key contacts 412.

The operation of the W relay also opens contacts 411 thus removing battery through the operated contacts of the L relay from the right-hand terminal of the condenser C5 thus allowing this condenser to discharge. The discharge of the condenser will be through the resistors R8 and R9 at this time, thus insuring that sufficient time is allowed for this condenser to be discharged at the completion of the answering of the call by the attendant.

When the attendant releases the line key L–100, contacts 413 open and remove ground from the right-hand winding terminal of the Z relay, thus allowing this relay to operate in a circuit extending from battery through the operated contacts 415 of the L relay, resistor R2, the winding of the Z relay, the operated contacts 417 of the W relay and the operated contacts 414 of the L relay. The operation of the Z relay at this time causes contacts 418 to close and complete a circuit for the operation of the H relay from ground through the operated contacts 414 of the L relay, the winding of the H relay, the closed contacts 418 of the Z relay, the closed contacts 421 of the W relay, the normal contacts 322 of the D relay to negative battery over the D–2 conductor to the position circuit and through the operated contacts 623 of the TA relay.

The H relay in operating completes a holding path through its operated contacts 419 which are in parallel with the operated contacts 418 of the Z relay.

The operation of the H relay causes contacts 313 to operate. The operation of these contacts interrupts the feedback circuit from the collector of transistor Q3 to the base of the transistor Q2 described above so that the Q2 transistor will be turned off. In addition the operation of the contacts 313 connect ground to the collector of the Q3 transistor thus interrupting the current flowing through this transistor. However, this ground extends through the CR6 diode to the lower winding of the L relay thus maintaining this relay operated to negative battery through the operated contacts 421 of the W relay, the normal contacts 322 of the D relay and over conductor D–2 and the operated contacts 623 of the TA–2 relay in the position circuit.

The operation of the contacts 313 of the H relay also interrupts the circuit extending to the CR2 diode and over the N lead to the audible signal in the auxiliary signal circuit 401.

The operation of the H relay causes the contacts 309 to operate which contacts disconnect the resistor R13 from the line circuit thus disconnecting the ringing control circuits described above. The contacts 311 also extend the line circuit to the contacts 316 of the Z relay.

The operation of the contacts 309 of the H relay together with the operation of the contacts 316 and 317 of the Z relay extend the tip and ring conductors 125 from the called line over the T1–2 and R1–2 conductors to the postion circuit. In the position circuit these conductors extend through the normal contacts 510 of the DL–2 relay and 511 and 512 of the PA2–2 relay thus completing a circuit for the operation of the PA–2 relay. relay. This circuit will trip the ringing in the central office and to the called subscriber's station and extend the talking conductor through the network and amplifier 513 to the operator or attendant's telephone set, whereupon she may converse with the calling subscriber.

The operation of the PA–2 relay closes contacts 612 and completes an obvious circuit for the operation of the PA1–2 relay.

The operation of the PA1–2 relay closes contacts 760 which completes a locking circuit for the J–2 and J1–2 relays through contacts 761 of the J–2 relay thus holding these relays operated while the call is connected to the position circuit.

The operation of the PA1–2 relay also causes contacts 611 to be operated which in turn interrupts the ground connected to the H–2 conductor extending to the line circuits and thus prevents the connection of any other line to this operator's position while the operator or attendant's position is interconnected with the line being answered.

At the completion of the conversation with the calling party the attendant will operate the position release key A–2 and thus open the contacts 712. As a result the TA–2 relay will release and interrupt the above-described holding circuits for the H and L relays of FIG. 4. The release of the L relay interrupts the circuits of the W and Z relays which relays in turn release thus restoring the line circuit to its initial condition. The release of the Z relay interrupts the operated contacts 316 and 317 thus interrupting the circuit of the PA–2 relay in the position shown in FIG. 5 which allows this relay to release and in turn causes the PA1–2 relay to release and restore the position circuits to their idle but active condition.

If the operator wishes, she may place the line on hold instead of release or disconnect. To do this the operator will again operate the line key L–100 and cause contacts 412 and 413 to again close. The closure of contacts 412 perform no useful function at this time. However, the closure of contacts 413 complete a circuit for shunting down the W relay by applying ground to its left-hand winding terminal. As described above, ground is already connected to its right-hand terminal through its operated contacts 417 and to operated contacts 414 of the L relay. Ground is connected to the left-hand terminal of the W relay in a circuit extended from ground through the operated contacts 314 of the Z relay, the operated line key contacts 413, the operated Z relay contacts 416 to the left-hand winding terminal of the W relay.

The W relay in releasing releases its contacts 417 thus transferring the ground on the right-hand winding terminal from the above-described circuit to a circuit through the break contacts 417 of the W relay and the line key contacts 413 to ground through the operated contacts 314 of the Z relay.

The release of the contacts 421 on the W relay transfers the holding circuit for the L and H relays from the operated contacts 623 of the TA–2 relay in position circuit to a circuit extending from negative battery through the operated H relay contacts 420 and the released W relay contacts 421, the lower winding of the L relay through the operated contacts 419 of the H relay to the winding of the H relay. The circuit further extends through the winding of the H relay to ground through the operated L relay contacts 414. The circuit for the L relay extends from the released contacts 421 of the W relay through its lower winding and then through the CR6 diode and operated contacts 313 of the H relay to ground.

The release of the W relay causes the contacts 315 to release and connect the interrupted battery received over the WK lead received over the auxiliary circuit and through the break contacts 315 and the operated H relay contacts 312 to the line lamp L–100 thus causing this lamp to flash on a different rate than when the call was first received indicating to the attendant that the corresponding line has been placed in the hold condition.

When the attendant releases the line key L–100, contacts 413 open and remove ground from the left-hand winding terminal of the Z relay through the break contacts 417 of the W relay. As a result the Z relay releases at this time and the contacts 316 and 317 are thus restored to their unoperated condition. Consequently, resistor R4 is bridged across the tip and ring conductors of the line 125 extending to the central office thus holding the central office equipment and maintaining the transmission path through this central office equipment to the calling subscriber and to the answering bureau.

The release of the contacts 316 and 317 also interrupt the tip and ring conductors extending over the T1–2 and R1–2 conductors to the operator or attendant's position circuit thus causing the PA–2 relay to release and this relay in turn causes the PA–1 relay to release and restore the position circuit to its normal condition so that the attendant may respond to or answer calls on other lines in a manner similar to that described above.

When it is desired to return to a line in the hold condition the attendant will again operate the line key L–100 causing contacts 413 and 412 to close. The closure of contacts 412 produces no useful results at this time. The closure of contacts 413 against completes the above-described circuit for the operation of the W relay which relay again closes contacts 315 and interrupts the flashing lamp L–100 and applies a steady voltage to it so that the lamp remains lighted.

The operation of the W relay also causes contacts 421 to close or be operated which contacts then transfer the holding circuit for the L relay and the H relay to the position circuit relay TA–2 in the manner described above. When the operator releases the line key, the contacts 413 will open and remove the short circuit from around the Z relay causing this relay to reoperate and actuate its contacts 316 and 317. As a result the bridge or holding resistor R4 is removed from across the tip and ring conductors of the line 125 extending to the called subscriber's line. In addition these tip and ring conductors are connected with the T1–2 and R1–2 conductors extending to the position circuit. In the position circuit they cause the operation of the PA–2 relay as described above and permit the operator or attendant to talk to the calling party. Thereafter the attendant may release the connection by operating the A release key 152 and open the contacts 712 thus releasing the TA–2 relay which in turn interrupts the locking circuit of the relays L and H allowing these relays to release which relays in turn cause relays W and Z to release in the manner described above and release the position circuit as well as the line circuit.

Instead of releasing the line the attendant may again place the line in a hold condition by again reoperating the line key whereupon the circuits will again operate in the manner described above.

When it is desired to signal the attendant to answer the call upon the first ring of the called subscriber's line, the switch 330 will be set in its one ring or middle position as shown in FIG. 3. With switch 330 set in its middle position ground is connected to the upper terminal of the CR8 diode. Consequently, when the L relay operates, in response to the first ring applied to the called subscriber's line, in the manned described above, contacts 311 are operated and as a result ground is connected through the operated contacts 311 and resistor R21 to the base of transistor Q2 thus turning on this transistor. Transistor Q2 then turns on the transistor Q3 which causes the line lamp L–100 to flash in the manner described above and causes the auxiliary circuit 401 to attract the attendant's attention. Thereafter the circuits operate in substantially the same manner as described above.

At certain other times during the day or other days it may be desirable to prevent the circuits from responding to any of the ringing signals applied to the subscriber's line. The circuits will not respond to ringing signals applied to the subscriber's line when the switch 330 is moved to the no ring position or the lower position as shown in FIG. 3. With switch 330 in this position negative battery is connected to the upper terminal of the CR8 diode so that upon the operation of the L relay the closure of contacts 311 connect the negative battery to the base terminal of the transistor Q2 through the R21 resistor, thus insuring that the base to the emitter junction of this transistor will be biased to the off condition and prevent the operation of this transistor. With transistor Q2 held in the off or nonconducting condition the transistor Q3 will similarly be held in the normal or off condition and thus prevent the lighting or flashing of the line lamp L–100 even though the L relay operates in response to each ringing signal applied to the subscriber's line.

As described herein each of the positions or consoles is arranged for two attendants, an A attendant and a B attendant. The calls are automatically directed to the A attendant if this attendant is free. If a B attendant is also at this position or console calls will be directed to the B attendant when the A attendant is busy. As described above the A attendant's position and control equipment is energized in response to the A attendant connecting her headset to the A attendant's jacks 520 and 521. Similarly the B attendant's position and control circuits are energized in response to the B attendant's connecting her headset to the B jacks 522 and 523. As a result the jack contacts 757 of the B1–2 jacks in the No. 2 position are closed and complete an obvious circuit for the operation of the JB–2 relay which in turn closes its contacts 713. These contacts complete an obvious circuit for the operation of the TB–2 relay shown in FIG. 7.

As before when a call is answered by the A attendant the PA–2 relay operates and in turn causes the operation of the PA1–2 relay. The operation of this relay removes one path from the H–2 conductor in the position circuit to ground. However, a second path now exists from this conductor H–2 through the TB–2 relay contacts 613 and the break contacts 614 of the PB1–2 relay to this H–2 conductor. In addition the operation of the PA1–2 relay connects ground through its operated contacts 611 to the J–2 conductor extending to the W relay contacts 320 of all of the line circuits assigned to the No. 2 position.

Thus, assume that the A attendant is busy answering some other call and that the line lamp L–100 lights indicating that a call is to be answered on this line. Also assume that a B attendant has inserted her headset in the jacks 522 and 523. The operation of the line key L–100 at this time causes the contacts 412 and 413 to close and in the manner described above causes the W relay to operate. Under these assumed conditions ground will be applied both to the J–2 and H–2 conductors from the position circuit due to the operation of the various relays as described above. The W relay in operating under these conditions, in addition to the functions described above also completes a circuit from ground in the position circuit through the operated contacts 611 and the J–2 conductor and then through the operated W contacts 320 in the line circuit and through the break contacts 321 of the Z relay to battery through the winding of the D relay thus causing this relay to operate. The operation of the D relay partially prepares a holding circuit through its operated contacts 323 which circuit becomes effective upon the operation of the Z relay contacts 321.

The operation of the D relay also operates its contacts 318 and 319 and transfers the tip and ring conductors 125 extending to the called line at the central office to the T2–2 and R2–2 conductors extending to the console or the position circuit. These conductors extend to the B attendant's position circuit instead of the A attendant's circuits thus permitting the B attendant to respond to this call.

The operation of the D relay also operates contacts 322 which transfers the holding or locking circuit for the H and L relays from the D–2 conductor and the contacts of the TA–2 relay in the position circuit to the E–2 conductor and the contacts of the TB–2 relay in the position circuit.

The circuits then operate in substantially the same manner as described above when the A attendant responds to and answers the call. When the B attendant's headset is connected to the line, relay PB–2 operates and closes contacts 627 which complete an obvious circuit for the operation of relay PB1–2. Relays PB1–2 in operating opens contacts 614 and removes ground from the H–2 conductor thus preventing the answering of any other calls until the calls being answered are released.

Upon completion of the answering of the call, the B attendant, of course, will operate momentarily her own B release key and cause the release key contacts 714 to be operated thus allowing the TB–2 relay to release momentarily and interrupt the holding ground for the L and H relays.

When desired the line may be placed in the hold position by the B attendant by reoperating the line key L–100 in the same manner as described above when the A attendant responded to the call. In addition thereafter when the Z relay releases in the manner as described above, contacts 321 release thus allowing the D relay to release. Thereafter either the A attendant or the B attendant may further respond to the call. If the A attendant is idle when the line key L–100 is again operated, the line circuit will be connected to the A attendant. If, however, the A attendant is busy when the line key L–100 is operated, then the call will be again handled by the B attendant in the manner similar to that described above.

Under some traffic conditions it may be desirable to have only an A attendant at each of the consoles or positions. Under these conditions the circuits have been arranged so that the A attendant at adjacent consoles or positions may cooperate with each other and the attendants at the adjacent positions answer calls at a given position in a manner similar to the B attendant as described above.

When it is desired to operate the system in this manner the attendant at the left-hand position will operate a grouping and team key such as 128. For this key to be effective the A attendant must have her telephone or headset connected to the A jacks 520 and 521 and no such telephone connected to the B attendant's position jacks 522 and 523. Likewise for this type of operation to be effective the A attendant's telephone must be connected to the jacks 820 and 821 and no telephone connected to the P position jacks 822 and 823 in the adjacent console. In addition the attendant in this position must not have operated her corresponding grouping and team key so that she is not cooperating with the attendant and console position on her right. Likewise the attendant at the first or left-hand position to position 2 must not have operated her grouping and team key to condition the circuits for team work or cooperation between the A attendants at the first and second positions.

Under these conditions the operation of the grouping and team key by the A attendant at the second position or console causes contacts 633 of the grouping and team key to close and complete a circuit for the operation of the WG–2 relay shown in FIG. 6. This circuit extends from ground 912 and through the break contacts 913 and 914 of the respective group and team key GT–4 and GT–3 and through closed contacts 633 of the GT–2 key, the break contacts 534 of the JB–2 relay, the closed contacts 615 of the J–2 relay, which relay is operated in response to the connection of the headset of the A attendant to the jacks 520 and 521 in the manner described above, the break contacts 631 or 632 of relays PA1–2 or ZG–2 respectively, and then through the normal contacts 616 of the WG–2 relay, and the winding of this relay to battery through the resistance R1–2. The relay WG–2 operates in this above described circuit. The relay ZG–2 does not operate at this time because it has ground connected to both of its winding terminals at this time. The ground connected to the normal contacts 616 described above is connected both to the right-hand winding terminal of relay WG–2 and to the left-hand winding terminal of relay ZG–2. In addition the ground from the J–2 relay contacts 615 is also connected through the break contacts 631 or 632 of relays PA1–2 or ZG–2 respectively, the normal contacts 618 of the ZG–2 relay to the right-hand winding terminal of the ZG–2 relay thus preventing this relay from operating.

The operation of the contacts 616 on the WG–2 relay replaces the ground through the GT–2 key contacts in the circuit described above with the locking ground through the operated contacts 616. This locking ground also extends to the left-hand winding terminal of the ZG–2 relay.

When the GT–2 key is released the contacts 633 will open and remove ground from the right-hand winding terminal of the ZG–2 relay thus permititng this relay to operate.

The operation of the ZG–2 relay causes the contacts 618 to operate and transfer the above-described circuit from the contacts 633 from the right-hand winding terminal of the ZG–2 relay to the left-hand winding terminal of the WG–2 relay. In addition the operation of the WG–2 relay causes contacts 619 to close and complete a circuit for the lighting of the group and team lamp 617 in the second position from battery through contacts 619 of the WG–2 relay, resistor R3–2, lamp 617, diode 636 to ground through the contacts 640 of the TM–2 relay which operates at this time as described below.

The operation of the WG–2 relay, in addition, causes contacts 719 to close and complete a circuit for the operation of the team relay TM–2. This circuit extends from ground through the normal contacts 720 of the TM–2 relay, which relay is released under the above assumed conditions, the operated contacts 719 of the WG–2 relay through the winding of the TM–2 relay, the normal contacts 1016 of the TM–2 relay which relay is released at this time, and then through the operated contacts 1017 of the J–3 relay to negative battery through the normal break contacts 1018 of the JB–3 relay in position 3. The operation of the TM–2 relay closes contacts 640 which complete an obvious circuit for the operation of relay PB2–2 and a circuit for lighting lamp 617 described above. The operation of the TM–2 relay causes contacts 721 to operate which complete an obvious circuit for the operation of the TM1–3 relay in the third position. The operation of the TM1–3 relay closes contacts 942 which complete an obvious circuit for the operation of relay PB2–3.

The operations of the TM–2 and TM1–2 relays condition the circuits to permit the cooperation between the A attendant in position 2 and the A attendant in position 3. The operation of the TM1–3 relay conditions the various circuits which prevent the cooperation between the A attendant at position 3 and the A attendant at position 4 due to the operation of its contacts 1014.

The operation of the relay TM–2 also causes contacts 620 to close and complete a circuit for the operation of the group and team lamp GT–3 in the position 3 in the circuit extending from ground through the operated contacts 942, diode 944, lamp 917 and resistor R3–3, the operated contacts 620 of the TM–2 relay and the operated contacts 619 of the WG–2 relay to battery.

The operation of the TM–2 relay also causes contacts 514 and 515 to close which contacts interconnect the conductors T1–2 and R1–2 of the position circuit 2 extending to the A attendant's position circuits with the conductors T2–3 and R2–3 of the position circuit 3 extending to the B attendant's position circuit in the adjacent console or position. Thus, the A attendant in position 2 may be connected to the line circuits interconnected with the third position in the same manner that the B attendant position in console 3 is interconnected with the corresponding line circuits.

Likewise the operation of the contacts 516 and 517 on the TM–2 relay connect the conductors T2–2 and R2–2 extending to the B attendant's position circuit and jacks in the second console with the conductors T1–3 and R1–3 in the third console or position circuit so that the A attendant in this position may be interconnected with the lines connected to the position 2 circuits in the same manner as the B attendant in position 2 is interconnected with these lines.

The operation of the TM–2 relay closes contacts 723 which contacts complete a circuit for the operation of the TB–2 relay from ground through the winding of the TB–2 relay, the break contacts 713 of JB–2 relay, closed contacts 723 of relay TM–2, and the break contacts 1012 of the A–3 release key 154 to battery.

Operation of relay PB2–2 as described above causes contacts 641 to close and complete a circuit for the operation of relay PB1–2. The operation of relay PB1–2 opens contacts 614 and removes ground through contacts 613 of TB–2 relay from the H–2 conductor to the line circuits. However, the operation of the TM–2 relay closes contacts 622 which connects ground to this conductor through the break contacts 923 of the PA1–3 relay when the A attendant at the third position or console is not answering a call. The operation of the TM–2 relay closes contacts 743 which in turn complete a circuit for the operation of relay XGR–2. This relay in turn opens contacts 744 and 745 which contacts interrupt the grouping control circuits described below.

Likewise the operation of the TM1–3 relay closes contacts 1022 which complete a circuit for the operation of the TB–3 relay from ground through the winding of the TB–3 relay, the break contacts 1013 of the JB–3 relay, closed contacts 1022 of the TM1–3 relay to battery through the break contacts 712 of the A–2 release key 152. The TM1–3 relay in operating closes contacts 942, as described above, which complete a holding circuit for relays J–3 and J1–3 from ground through contacts 942 and diode 1035 to battery through the windings of relays J–3 and J1–3.

The closure of contacts 942 also completes an obvious circuit for the operation of relay PB2–3. This relay in turn opens contacts 915 and removes ground from the H–3 conductor through the contacts 916 of the TB–3 relay. However, the operation of relay TM–2 closes contacts 621 which contacts connect ground to this H–3 conductor through the break contacts 644 of the PA1–2 relay when the A attendant in position 2 is not answering a call.

The operation of the TM1–3 relay closes contacts 1015 and completes an obvious circuit for the operation of relay XGL–3 which relay in turn opens contacts 1016 and 1017 and interrupts the circuits controlling the grouping of the positions described below.

Thus, if the attendant at the A position in the second console is busy answering some call on another line and a call is made to the line to which the conductors 125 are connected, then, in response to the lighting of the line lamp L–100 and the operation of the line key L–100 including contacts 412 and 413 the line circuit will respond in the same manner described above and cause the D relay to operate and interconnect the conductors 125 with the conductors T2–2 and R2–2. These conductors in turn will be interconnected through the contacts 516 and 517 of the TM–2 relay to the conductors T1–3 and R1–3 of the A attendant's position in the position or console No. 3, if this attendant is not busy answering some call on the line connected to the consoles or positions Nos. 2 or 3.

The circuit for the operation of the D relay in the line circuit extends at this time over the J–2 conductor in the same manner described above.

The circuit for the operation of the W relay under these conditions now extends from ground through the break contacts 923 of the PA1–3 relay which relay will be released at this time providing the A attendant at the third position is idle and not engaged in answering a call. From the contacts 923 the circuit extends through the operated contacts 622 of the TM–2 relay and then over the H–2 conductor and normal contacts 314 of the Z relay to the contacts 413 of the line key L–100.

As described above, the locking circuit for the H and L relays extend through the contacts 624 of the TB–2 relay. This relay is operated at this time in a circuit extending from ground through the winding of the TB–2 relay, the normal contacts 713 of the JB–2 relay and then through the contacts 723 of the TM–2 relay to battery through the release contacts 1012 of the A–3 release key of the third console or third position circuit. Thus, when the A attendant in position No. 3 desires to release the connection over the conductors 125 to the subscriber's line in the manner described above, she will operate her A release key which causes the contacts 1012 to open and thus release the TB–2 relay. This relay causes the holding circuits of the H and L relays to be interrupted thus allowing these relays to release in the manner described above.

When the positions are interconnected for teaming operation as described above the operation of the TM–2 relay causes the operation of relay PB2–2 and the operation of the TM1–3 relay causes the operation of relay PB2–3. The operation of relay PB2–2 opens contacts 758 which prevents the operation of relay JB–2 and the operation of relay PB2–3 opens contacts 1030 which prevents the operation of relay JB–3. Thus an attempt by a B attendant to connect her headset in either position when it is interconnected for teaming is ineffective. It is necessary to disassociate the positions as described below before a B attendant can effectively connect her headset to a position.

If the A attendant at position 3 is busy answering a call and the A attendant in position 2 is idle and desires to answer a call appearing in console No. 3 under the present assumed conditions with the team grouping key contacts 633 having been momentarily closed as described above, she will operate the line key on the line connected to the third console position which she desires to answer. At this time, the operating circuit for the W relay will extend from ground through the break contacts 644 of the PA1–2 relay, the operated contacts 621 of the TM–2 relay to the H–3 lead and then over the above-described circuits. Similarly at this time, the operating circuit of the TB–3 relay shown in FIG. 10 extends from ground through the winding of TB–3 relay, break contacts 1013 of the JB–3 relay in the third console which contacts will be normal because relay JB–3 is not operated since the B attendant will not be present or will not have her headset connected to the jacks 822 and 823.

From the contacts 1013 the circuit then extends through contacts 1022 of the TM1–3 relay to battery through the release contacts of the A–2 key 712. Thus, in order to release this connection the A operator will operate her A release key which will cause the TB–3 relay to interrupt the locking or holding circuit of the H and L relays in the manner described above and thus release these relays and restore the circuits to their idle condition.

If it is desired to team position 2 with position 1 or position 3 with position 4, it is first necessary to interrupt the above-described teaming circuits and arrangements between positions 2 and 3. Positions 2 and 3 may be disassociated from each other by the attendant again operating the grouping and teaming key 128 in position 2 when a call is not being answered in position 2 thus again closing the contacts 633. If a call is being answered at this time the PA1–2 relay will be operated so contacts 631 will be open. Relay ZG–2 is also operated so contacts 632 will be open so the operation of key contacts 633 will be ineffective. Closure of these contacts at this time with contacts 631 closed connect ground to the left-hand winding terminal of the WG–2 relay in a circuit extending through the operated contacts 633, operated contacts 634, operated contacts 615, break contacts 631 and operated contacts 618 to the left-hand winding terminal of the WG–2 relay. Thus ground is connected to both winding terminals of this relay which causes the relay to release. Then when the key 128 is released ground will be removed from the left-hand winding terminal of the ZG–2 relay causing this relay to release and thus restore these relays to their initial position.

The release of the relay WG–2 causes the contacts 619 to open and thus extinguish the lamps 617 and 917.

The release of the WG–2 relay causes contacts 719 to open and thus release the TM–2 relay. This relay in turn causes contacts 721 to open and release the TM1–3 relay. The release of these relays disconnects the above-described teaming circuits through the contacts 514, 515, 516, and 517 as well as the control contacts 723 and 1022. The contacts 1014 are also released so that it is possible to interconnect the position circuit 3 with position circuit 4 in the same manner as described above for interconnecting position circuit 2 with position circuit 3. In this instance it is necessary to operate the grouping key GT–3 key in the third position or console. The circuits in positions 3 and 4 operate in response to the operation of this key in the manner similar to that described above for the circuits in positions 2 and 3 in response to the operation of the key GT–2.

Similarly when it is desired to have the first and second position circuits cooperate in the manner described above the key GT–1 in the first position or console will be operated.

At times of light loads provision has been made to permit one A attendant at any one of the consoles to answer calls at all of the consoles.

All that is necessary, in accordance with this aspect of my invention, is for the attendant to operate the grouping and teaming key at the console at which her headset is connected in the A position and the circuits will be automatically conditioned to permit her to answer calls at any of the other consoles or positions as well as at her own position or console.

Assume that the A attendant has connected her headset to jacks 520 and 521 at the No. 2 position or console which in turn causes the contacts 710 to close and operate the J–2 and J1–2 relays.

The system works as described above for answering calls at the position in which the operator or attendant's headset is interconnected with the A attendant's jacks. In addition the operation of the group and team key 128 under the assumed conditions when the attendant is not answering a call causes contacts 633 to close which in turn causes the WG–2 relay to operate as described above. The release of this key then causes the ZG–2 relay to operate in the manner described above. At this time the circuits are all conditioned to permit the single A attendant to answer calls at any of the other consoles as well as at her own.

Assume first that the cross connections 724, 725, 726, 727 and 728 are provided as shown in FIG. 7.

The operation of the WG–2 relay at this time causes contacts 742 to close and complete a circuit for the operation of the GL–2 relay from ground through the operated contacts 742 of the WG–2 relay, the winding of GL–2 relay, the normal contacts 746 of the XGL– relay, the normal contacts 747–XGR–1 relay, the normal contacts 750 of the J–1 relay, and the normal contacts 754 of the JB–1 relay in the No. 1 console to negative battery in console to negative battery.

The operation of the WG–2 relay causes contacts 751 to close and complete a circuit for the operation of the GR–1 relay in console No. 1 from negative battery through the operated contacts 751 of the WG–2 relay, the normal contacts 752 of the XGL–2 relay, the normal contacts 753 of the XGR–1 relay, the winding of the GR–1 relay, the operated contacts 754 of the GL–2 relay to ground through the operated contacts 742 of the WG–2 relay.

The operation of the GL–2 relay and the GR–1 relay cause the contacts 733 of the GL–2 relay and contacts 734 of the GR–1 relay to close and complete a circuit for the operation of the TA–1 relay from ground through the winding of this relay, the break contacts 741 of the A release key in the No. 1 console, the operated contacts 734 of the GR–1 relay, the operated contacts 733 of the GL–2 relay, the release contacts 748 of the A release key in the No. 2 console, the operated contacts 711 of the J–2 relay and the break contacts 712 of the A release key for the A attendant in the No. 2 console to negative battery. The operation of relay TA–1 closes contacts 649 on this relay and thus prepares a holding circuit for the H and L relays in the line circuits which are interconnected with this console as described above with reference to the line circuit 125 connected to the No. 2 console.

The operation of relay GR–2 causes contacts 642 to close and the operation of relay GL–2 causes contacts 643 to close. These contacts then complete a circuit for lighting lamp 617 from ground through either of these contacts and diode 643 through lamp 617, resistor R3–2 to battery through the operated contacts 619 of the WG–2 relay.

The operation of the GR–1 relay closes contacts 543 and 544 and the operation of the GL–2 relay closes contacts 531 and 532. The operation of these contacts connect the T1–1 and R1–1 conductors of the A attendant's position of the No. 1 console to the conductors T1–2 and R1–2 respectively of the A attendant's position in the No. 2 console, thus conditioning the circuits to permit the A attendant in the No. 2 position to answer calls incoming to the No. 1 position or console.

The attendant at the A position in console No. 2 will respond to and answer the call incoming to the first position in the same manner as described above. When the line lamp lights in response to either the first ring or the third ring as described, the attendant will operate the corresponding line key. Inasmuch as the TA–1 relay is operated, contacts 625 will be closed and connect ground to the H–1 conductor extending to the line circuits connected to the first position if the PA1–2 relay is released indicating that this attendant is not answering another call. Consequently, the W and Z relays will operate in the same manner described above. The H and L relays also operate as described. These relays then lock operated over conductor D–1 to ground through the contacts 649 which are closed due to the operation of the TA–1 relay.

The T1 and R1 conductors from the line circuit are then extended to the T1–1 and R1–1 conductors of the first position circuit. These conductors are interconnected to the T1–2 and R1–2 conductors of the second position circuit through the operated contacts 543 and 544 of the GR–1 relay and contacts 531 and 532 of the GL–Z relay. As a result the PA–2 relay operates and causes the PA1–2 relay to operate due to the operation of contacts 612. A circuit also extends from the closed contacts 612 of the PA–2 relay for the operation of the PA1–1 relay from battery through the winding of the PA1–1, ground through the operated contacts 612 of the PA1–2 relay. The operation of the PA1–1 relay causes the contacts 626 to operate and remove ground from the H–1 lead thus preventing any other calls directed to the position No. 1 to be answered until the call being answered is released. Similarly, the PA1–2 relay in operating operates the contacts 611 which remove ground from the H–2 lead thus preventing any calls incoming to the second console or position to be answered until the call or line being answered is released.

The attendant may release the call either by operating her A release key in position No. 2 which opens contacts 712 and 748 and causes relays TA–1 and TA–2 both to release or she may operate the A release key in position 1 which causes contacts 741 to operate and release the TA–1 relay. The release of this relay opens contacts 649 and allows the relays H and L to release and these relays in turn restore the line circuit to its original condition in a manner as described above.

The momentary operation of the group and team key GT–2 causes contacts 633 to close and then open which in turn operate the WG–2 and ZG–2 relays in a manner as described above. The operation of these relays in addition to causing the circuits of position 1 to be interconnected with the attendant's position circuit in position 2 also cause the position circuits in the other consoles to be connected to the position circuits of the second console.

Thus, the operation of the WG–2 relay causes contacts 742 to close and complete a circuit for the operation of the GR–2 relay which circuit extends from ground through the operated contacts 742 of the WG–2 relay, the winding of the GR–2 relay, the normal contacts 744 of XGR–2 relay, the cross connection 724 and through the break contacts 1019 of the XGL–3 relay, the break contacts 1017 of the J–3 relay, to battery through the break contacts 1018 of the JB–3 relay to battery. The WG–2 relay in operating also closes contacts 751 which complete a circuit for the operation of the GL–3 relay from battery through the operated contacts 751 of the WG–2 relay, the break contacts 745 of the XGR–2 relay, the cross connection 725, the break contacts 1020 of XGL–3 relay, the winding of the GL–3 relay, the cross connection 726, the operated contacts 755 of the GR–2 relay, to ground through the operated contacts 742 of the WG–2 relay.

The operation of the GR–2 and the GL–3 relays operate the respective contacts 756 and 1033 which interconnect the winding TA–3 relay with the winding of the TA–2 relay and thus condition the circuits at the No. 3 console for responding to calls incoming to this console. In addition the operation of these two relays also connect the T1–3 and R1–3 conductors of the A position to the corresponding conductors T1–2 and R1–2 so that the A attendant at the second position may be interconnected with any of the lines incoming in the third position or console.

In addition the operation of the PA–2 relay in the second position circuit causes the PA1–2 relay to operate as described above and also completes a circuit for the operation of the PA1–3 relay from ground through the operated contacts 612 of the PA–2 relay, contacts 629 of the GR–2 relay, contacts 927 of the GL–3 relay to battery through the winding of the PA1–3 relay. This relay operates and removes battery from the H–3 lead in a manner similar to that described above for the H–1 and H–2 leads and thus prevents the attendant from answering another call until the call being answered is released.

Similarly the attendant may release a call in the No. 3 position or console by the operation of the A release key either in the No. 3 position or console circuits or in the No. 2 position or console circuits.

The attendant's position A in the No. 4 console is similarly connected in parallel with the A attendant's position in the No. 2 console. Thus, the GR–3 relay operates in the circuit extending from ground through the operated contacts 742 of the WG–2 relay, cross connection 727, the break contacts 1021 of the GL–3 relay, through the winding of the GR–3 relay, through the break contacts 1022 of the XGR–3 relay, the break contacts 1022 of the XGL–4 relay to battery through the break contacts 1038 of the J–4 relay and the B2–4 jack contacts 1049. The operation of the GR–3 relay causes contacts 1024 to close and complete a circuit for the operation of relay GL–4 from ground through the operated contacts 742 of the WG–2 relay, the operated contacts 755 of the GR–2 relay, the cross connection 726, the operated contacts 1024 of the GR–3 relay, the winding of the GL–4 relay, the break contacts 1026 of the XGR–3 relay, the break contacts 1017 of the J1–3 relay to battery through break contacts 1018 of the B attendant's headset jack in position or console No. 3.

The operation of the relays GR–3 and GL–4 interconnects the T1–4 and R1–4 conductors of the fourth console with the T1–2 and R1–2 conductors of the second console. Also the TA–4 relay is operated in a circuit from ground through the winding of the TA–4 relay break contacts 1070 of the A release key 156 of the fourth console, contact 1071 of relay GL–4, contacts 1032 of relay GR–3, contacts 1033 of relay GL–3, the connection 728, contacts 756 of relay GR–2, contacts 748 of the A release key 152 of the second console, contacts 711 of the J–2 relay to battery through contacts 712 of the A release key 152 of the second console.

When the operator answers a call on a line incoming to the fourth console relay PA–2 operates and in turn causes relays PA1–2, PA1–3, and PA1–4 to operate in turn so no other calls may be answered until the previous call has been answered or placed on hold as described above.

In a similar manner the corresponding relays in any of the additional positions or consoles as may be provided will be operated. These relays interconnect the position circuits of the various consoles and the control circuits in the manner described above so that an attendant may answer a call from any of these positions with her headset interconnected with any one of the various A positions in the consoles.

If, instead of assuming that only the A attendant has her headset connected also assume that an A attendant is occupying the fourth console and has her headset connected to the A jacks of this console, then the J–4 relay will be operated and cause contacts 1038 to be operated; as a result the GR–3 relay will not operate and will not cause the GR–4 relay to operate. In addition with the GL–3 relay operated contacts 1027 are closed and with relay GR–3 released contacts 1028 are released so an obvious circuit is completed for the operation of relay XGR–3. The operation of relay XGR–3 opens contacts 1022 and 1026 thus further preventing the grouping of position 4 with position 3 and the other positions or consoles. Consequently, neither the position transmission circuits T1–4 and R1–4 nor the control circuits of the TA–4 relay nor the release key contacts 1070 will be connected to the transmisison or control circuits in the position or console No. 2.

Thus, the operation of the grouping and team key position 2 under these conditions will cause the position and control circuits of the consoles between this position and the next position occupied in either of both directions to be interconnected with the A attendant's circuits at the position in which her headset is connected.

If only the No. 2A position is occupied the grouping and team lamps GT–1, GT–2, GT–3, GT–4, etc. will also all be lighted due to the operation of the contacts 619 of the WG–2 relay and the various operated contacts 639 and 645 of the GR–1 relay, 630 and 642 of the GR–2 relay, 929 and 945 of the GR–3 relay and contacts 946 of the GL–4 relay. These lights indicate that the positions are all grouped together for operation under the control of the A attendant in the particular position occupied by her.

If, however, an attendant is also occupying the A position of the fourth console then the GR–3 relay will not be operated as described above so that contacts 929 will not be closed. Under these conditions only the lamps GT–1, GT–2 and GT–3 will be lighted while the group and team lamp GT–4 in the No. 4 console will not be lighted, thus indicating that this position or console is not grouped with the other three consoles.

Similarly, if the No. 4 console is attended by an A attendant having her headset connected to the A attendant's jacks then the PA1–4 relay is not operated in response to the operation of the PA–2 relay for example, because the contacts 928 of the GR3 relay will not be operated.

Assume that an A attendant has her headset connected to the A jacks in position 2. Also assume that all the other positions are grouped to this position as described above. In addition assume further that an attendant has been assigned to position 4 and attempts to connect her headset to this position. At this time the GL–4 relay in position 4 is operated as described above. Consequently, its contacts 930 are closed to operate relay PA2–4. The operation of relay PAZ–4 opens its contacts 1029. The operation of contacts 1029 opens the operating circuit of the J–4 and J1–4 relays so that the connection of a headset to the A jacks of position 4 is ineffective so long as this position is grouped with any other position. In a similar manner the operation of the corresponding relays in other unoccupied positions prevent the connection of a headset to the circuits of these positions so long as they are grouped with another position.

In order to permit an attendant to operate position 4 or any other grouped position, the grouping and interconnecting circuits must be disabled by momentarily operating the teaming and grouping key in position 2, in the example assumed above. This restores the grouping circuits including the relay PA2–1, PA2–3 and PA2–4 in the manner described herein. Then the connection of a headset to the A jacks of position or console 4 activates the circuits of this position or console in a manner similar to the manner in which the circuits of console No. 2 are activated as described herein. Also the circuits of the other consoles may be activated in a similar manner so long as the circuits of these other consoles are not grouped with the circuits of other consoles.

The position control circuits have been arranged to permit dividing of the system into two or more sections or to group the entire system as one section under control of the team and grouping keys and connection of attendant's headsets to the position circuits.

Thus by removing the cross connections 724, 725, 726, 727 and 728, the position circuits may be divided into two groups or they may be operated as a single group depending upon the traffic conditions.

Assume that these cross connections are removed and that a single attendant has her headset connected to one of the A attendant's positions, assumed jacks 520 and 521 for example. Under these conditions the J1–2 and J–2 relays will be operated with the results that the contacts 763 will also be operated. The other relays J1–1 and J–1 as well as J–3, J–4 and J1–3 and J1–4 will all be released. So will the contacts 761, 1060, 1061 all be released.

Consequently, a circuit is completed for the operation of the relay MG–2. This relay in turn operates its contacts 757 which causes relay MG1–2 to operate and close contacts 770, 771, 772, 773 and 774. As a result when the B attendant at the No. 2 console operates the grouping and team key GT–2 the positions will all be grouped together as described above.

If another attendant connects a headset to the A jacks of positions 3 or 4 when these positions are not grouped so the corresponding J–3, J1–3, J–4 or J1–4 relays are not operated, then the operating circuit of relay MG–2 is interrupted so this relay releases and releases relay MG1–2. As a result, the contacts 770, 771, 772, 773 and 774 all release and in turn prevent the operation of the control or grouping relays GR–2 and GL–3 so that the consoles are divided into two groups and operate independently of each other. However, the consoles and positions within each group may be interconnected as described above.

Also, when desired, if two A attendants occupy adjacent positions their positions may be interconnected for team work and at the same time the positions on the other sides will be grouped by the operation of the various keys as described above. However, under these conditions the grouping circuits between the two adjacent positions are interrupted. Thus, if contacts 759 of the J–2 relay and contacts 1031 of the J–3 relay are all operated a circuit is completed for the operation of relay XGL–3 which relay opens contacts 1019 and 1020 which interrupt grouping cricuits between these positions so the grouping interconnections will not interfere with or affect the teaming interconnection between these positions. Similar circuits are provided between the other adjacent positions.

It is to be understood that the above-described arrangements are illustrative of the application of the principles of the invention. Numerous other arrangements may be devised by those skilled in the art without departing from the spirit and scope of the invention.

What is claimed is:

1. In combination in a telephone switching system, subscriber's lines connected thereto, a telephone answering bureau, means for extending said subscriber's lines to said answering bureau, a plurality of attendant positions at said answering bureau, attendants' headsets for said positions, position control circuits for said positions for connecting the attendant's headset with said lines, a manual switch connected to each of said control circuits, and means responsive to the operation of a single one of said switches at an occupied position for interconnecting said occupied position control circuit with the position control circuits of the positions between said occupied position and the next occupied position.

2. A telephone switching system in accordance with claim 1 characterized in that additional switching circuits are interconnected with said single switch responsive to a second operation thereof for disconnecting the previously interconnected position control circuits.

3. In a telephone switchboard in combination a plurality of operator's positions, operator's headsets for said positions, control circuits for a first operator and a second operator at each of said positions, a manually controlled switch connected to each of said position control circuits, means for directing all incoming calls to said first operator when said first operator is not busy, means for directing incoming calls to said second operator when said first operator is busy, and interconnecting means responsive to the operation of one of said manually controlled switches at one of said positions for interconnecting adjacent control circuits for directing calls to the first operator at each adjacent position when said first operator is busy.

4. A telephone switchboard in accordance with claim 3 characterized in that said control circuits include switching means responsive to a second operation of said manually controlled switch for disconnecting said adjacent control circuits.

5. In combination in a manual telephone system, a plurality of operator's positions, an operator's headset and a manual key for each position, switch means for dividing said operator's positions into groups, control circuits for each of said positions, and means jointly responsive to the connection of a single operator's headset to one of said positions and the operation of a single manual key for interconnecting all of said control circuits.

6. In combination in a manual telephone system in accordance with claim 5 characterized in that switching means responsive to the connection of an operator's headset to one position in each of two groups of positions is interconnected with said control circuits for preventing the interconnection of the control circuits of any of the positions of one of said groups of adjacent positions with the control circuits of any of the positions of another group of said adjacent positions.

7. In combination in a manual telephone system, a plurality of operator's postions, an operator's headset and a manually controlled switching key for each of said postions, means for directing calls to said positions, control circuits for each of said positions, and interconnecting circuits for interconnecting said control circuits of adjacent positions responsive to the connection of an operator's headset to adjacent position control circuits and to the operation of a single manual key to permit operators at either of said adjacent positions to answer calls directed to either of said positions.

8. In combination in a manual telephone system in accordance with claim 7 characterized in that additional interconnecting means are provided to interconnect said control circuits of unoccupied positions with the control circuit of an occupied position, said additional interconnecting means responding to the connection of an operator's headset at one of said positions and the momentary operation of a key at said one operator's position.

9. In combination in a telephone system, a plurality of operator's positions, control circuits for each of said positions, an operator's headset connectable to each of said position control circuits, a manually controlled switch interconnected with the control circuits for each of said positions, and means responsive to the connection of a headset to one of said positions and the operation of said manually controlled switch interconnected with said position for interconnecting the control circuits of positions between said one position and the next position to which an operator's headset is connected.

10. In combination in a telephone system in accordance with claim 9 characterized in that additional switch means is included in said position control circuits for preventing the connection of an operator's headset to any position control circuit which is interconnected with another position control circuit.

11. In combination in a telephone system in accordance with claim 9 characterized in that other switch means is included in said position control circuits responsive to the connection of an operator's headset to adjacent position control circuits for preventing the establishing of said interconnections between said position control circuits.

12. In combination in a telephone system in accordance with claim 9 characterized in that said positions include incoming circuits responsive to incoming calls and means for interconnecting said incoming circuits from any of said interconnected positions with said operator's headset and further characterized in that said position control circuits include means responsive to the interconnection of one of said incoming circuits to said operator's headset for rendering said manually controlled switch ineffective.

13. In combination in a telephone system in accordance with claim 11, characterized in that said position includes incoming circuits responsive to incoming calls and also that additional circuits are interconnected between said adjacent positions responsive to the operation of said manually controlled switch to interconnect said incoming circuits in either of said positions to either of said headsets when the other headset is interconnected with another of said incoming circuits.

14. In combination in a telephone system in accordance with claim 9 characterized in that said positions include incoming circuits responsive to incoming calls and means for interconnecting said incoming circuits and said position circuits, and further characterized by means responsive to the interconnection of an incoming circuit with a position control circuit for preventing the disconnection of said control position circuit and said incoming circuit by the inadvertent disconnection of said headset from said position control circuit.

15. In combination in a telephone system in accordance with claim 9 characterized in that said positions include incoming circuits responsive to incoming calls and means for interconnecting said incoming circuits with said position control circuits, and means responsive to a second operation of said manually controlled switch for disconnecting said interconnected position control circuits.

16. In combination in a telephone system in accordance with claim 15 further characterized in that control means are included in said position control circuits responsive to the interconnection of one of said incoming circuits with an interconnected control circuit for rendering the second operation of said manually controlled switch ineffective.

References Cited

UNITED STATES PATENTS 1,942,471 1/1934 Buchanan ___________ 179—41

KATHLEEN H. CLAFFY, *Primary Examiner.*

WILLIAM C. COOPER, *Examiner.*